United States Patent [19]
Evans

[11] Patent Number: 6,062,417
[45] Date of Patent: May 16, 2000

[54] LIQUID STORAGE TANK AND BAFFLE SYSTEM

[76] Inventor: Bruce Evans, P.O. Box 813, Highway 61 South, Shepherdsville, Ky. 40165

[21] Appl. No.: 09/299,322

[22] Filed: Apr. 26, 1999

[51] Int. Cl.[7] .................................................. B65D 25/00
[52] U.S. Cl. .......................................... 220/563; 220/88.1
[58] Field of Search ................................. 220/563, 88.1, 220/4.12, 4.13, 4.14, 4.15, 734

[56] References Cited

U.S. PATENT DOCUMENTS

| | | | |
|---|---|---|---|
| 3,349,953 | 10/1967 | Conaway et al. | 220/88.1 X |
| 3,822,807 | 7/1974 | MacDonald et al. | 220/88.1 |
| 4,613,054 | 9/1986 | Schrenk | 220/88.1 |
| 5,575,339 | 11/1996 | Alhamad | 220/88.1 X |

*Primary Examiner*—Steven Pollard
*Attorney, Agent, or Firm*—Scott R. Cox

[57] ABSTRACT

A liquid storage tank and non-permanent baffle system, wherein the storage tank encloses a liquid storage space, wherein the system includes the liquid storage tank, an opening provided in a surface of the liquid storage tank, and a plurality of spherical baffle balls introduced into the liquid storage tank through the opening, wherein the baffle balls substantially fill the liquid storage space within the liquid storage tank, and wherein the diameter of the baffle balls is slightly smaller than the diameter of the opening in the liquid storage tank.

20 Claims, 3 Drawing Sheets

LIQUID STORAGE TANK AND BAFFLE SYSTEM

BACKGROUND OF THE INVENTION

1. Field of the Invention

This invention relates to a liquid storage tank containing a non-permanent baffle system. In particular, this invention relates to a liquid storage tank, particularly for securing to trucks or other storage systems, containing a plurality of spherical baffle balls, which substantially fill the space within the liquid storage tank.

2. Description of Related Art

Trucks, particularly tank trucks, are widely used for transporting many types of liquids, particularly water and water-based chemicals. Many of the tanks used on these trucks have a storage capacity of at least 100 gallons, and sometimes as much as 3,000 gallons or more. With a weight of over 8 lbs. per gallon for water, the overall weight of a load of water in one of these tanks can be 12 tons or more.

Tank trucks travel on conventional highways and are required to be driven at conventional speeds. The inertial force present in a load of such liquids contained within one of these tanks can be extremely high. When it is necessary to stop these vehicles, this inertial force, which is enhanced by the sudden shifting of the liquid in the tank, can have a serious destabilizing effect on the vehicle. In addition, the continual sloshing movement of the liquid within the tank can damage the tank by putting pressure on its welds or joints. An especially dangerous situation can arise when a vehicle with such a tank is driven on a wet or icy road.

To reduce the destabilization caused by the movement of these liquids within the tank, the tank should be filled to capacity. However, this is not always possible or even desirable.

One proposed solution to this problem is the installation of fixed baffles within the interior of the tank which are secured at right angles to the direction of anticipated movement of liquids contained within the tank. Such baffles form smaller compartments within the tank, limiting the distance that the liquid can slosh within the tank. Examples of tanks containing this type of baffles are disclosed in U.S. Pat. Nos. 4,251,005; 2,011,161; and 1,909,734. In addition, circular shaped, dished baffles secured within a tank on a water truck designed to attenuate forces directed at them are disclosed in U.S. Pat. No. 4,789,170.

The number of baffles required and their structure depends on the size and capacity of the tank in which they are incorporated, the density of the liquid being carried, the anticipated speed of the vehicle, and other such considerations. It has been determined, however, that while fixed baffles are frequently helpful, they do not completely ameliorate the adverse effect of movement of the liquid within the tank. These fixed baffles merely create a series of smaller tanks, resulting in the same types of problems only in several smaller tanks. Sloshing of the liquid in these smaller tanks and the momentum of the load generated by movement of the liquid contained within the tank still exists.

As an alternative to the use of fixed baffles within a tank, U.S. Pat. No. 3,784,050 discloses a floating baffle system comprising a plurality of individual spherical objects, each of which is designed to float in the liquid and absorb the kinetic energy present within the liquid by collision of those objects among themselves. This baffle system is specifically designed for utilization in a fuel tank but the system is not designed to fill the tank to capacity. In addition, the individual spherical objects are required to have a specific density which is only slightly greater than the specific density of the fuel contained within the tank. At rest, they sink to the bottom of the tank and upon agitation, they distribute themselves throughout the tank. The tank is designed to be built with these spherical members already present in the tank.

Another type of liquid transportation system utilizes solid collapsible containers, such as ordinary tennis balls, as baffles within a tank to dissipate the "water hammer" effect caused by the sudden deceleration of a mass of liquid, is disclosed in U.S. Pat. No. 5,303,843. However, such solid containers will occupy a significant portion of the space within the tanks.

U.S. Pat. No. 3,687,329 discloses a liquid storage system containing a plurality of solid, buoyant bodies or spheres which float on the surface of the storage system. This system is designed to reduce the fire risk of the flammable liquids contained in the storage tank. However, these buoyant bodies also occupy a significant portion of the space within the tank. See also U.S. Pat. No. 3,192,877.

While the above-referenced devices are helpful in the attenuation of inertial forces of liquids contained within tanks, there are still a number of deficiencies in these systems. In addition, the above-referenced baffle systems are conventionally built into the tank during construction of the tank. Further, the prior art baffle systems cannot be modified to accommodate changes in the use of the tank.

It is accordingly an aspect of this invention to disclose a liquid storage tank and baffle system.

It is a further aspect of this invention to disclose a liquid storage tank and baffle system utilizing a plurality of spherical baffle balls which can be introduced into a conventional storage tank after the tank has been constructed.

It is a still further aspect of the invention to disclose a liquid storage tank and baffle system wherein baffle balls of the baffle system substantially fill the space within the liquid storage tank. It is a still further aspect of the invention to disclose a liquid storage tank and baffle system wherein baffle balls of the baffle system are sized to just fit within the opening in the storage tank used for the introduction of the liquid into the liquid storage tank.

It is a still further aspect of the invention to disclose a liquid storage tank and baffle system wherein the baffle balls occupy no more than about five percent (5%) of the space contained within the liquid storage tank.

It is a still further aspect of the invention to disclose a liquid storage tank and baffle system wherein each spherical baffle ball of the baffle system is produced in separate pieces which are joined together for introduction into the liquid storage tank.

It is a still further aspect of the invention to disclose a liquid storage tank and baffle system wherein the spherical baffle balls used in the system contain support ribs molded into the surface of the baffle balls to provide structural support.

These and other aspects of the invention can be determined by an analysis of the disclosed liquid storage tank and non-permanent baffle system and the design for the individual components of that system which are disclosed by the present invention.

BRIEF SUMMARY OF THE INVENTION

The present invention is a liquid storage tank and non-permanent baffle system (10) which includes a liquid storage tank (20), wherein the tank (20) encloses a liquid storage space (26), an introduction system for introducing liquid into the liquid storage tank (20), preferably an opening (22), and a plurality of spherical baffle balls (40) 20 introduced through the opening (22) into the liquid storage tank (20), wherein the baffle balls (40) substantially fill the space (26) within the liquid storage tank (20) and wherein the diameter of the baffle balls (40) is only slightly smaller than the diameter of the opening (22) in the tank (20).

DETAILED DESCRIPTION OF THE PREFERRED EMBODIMENT

Figure 1:
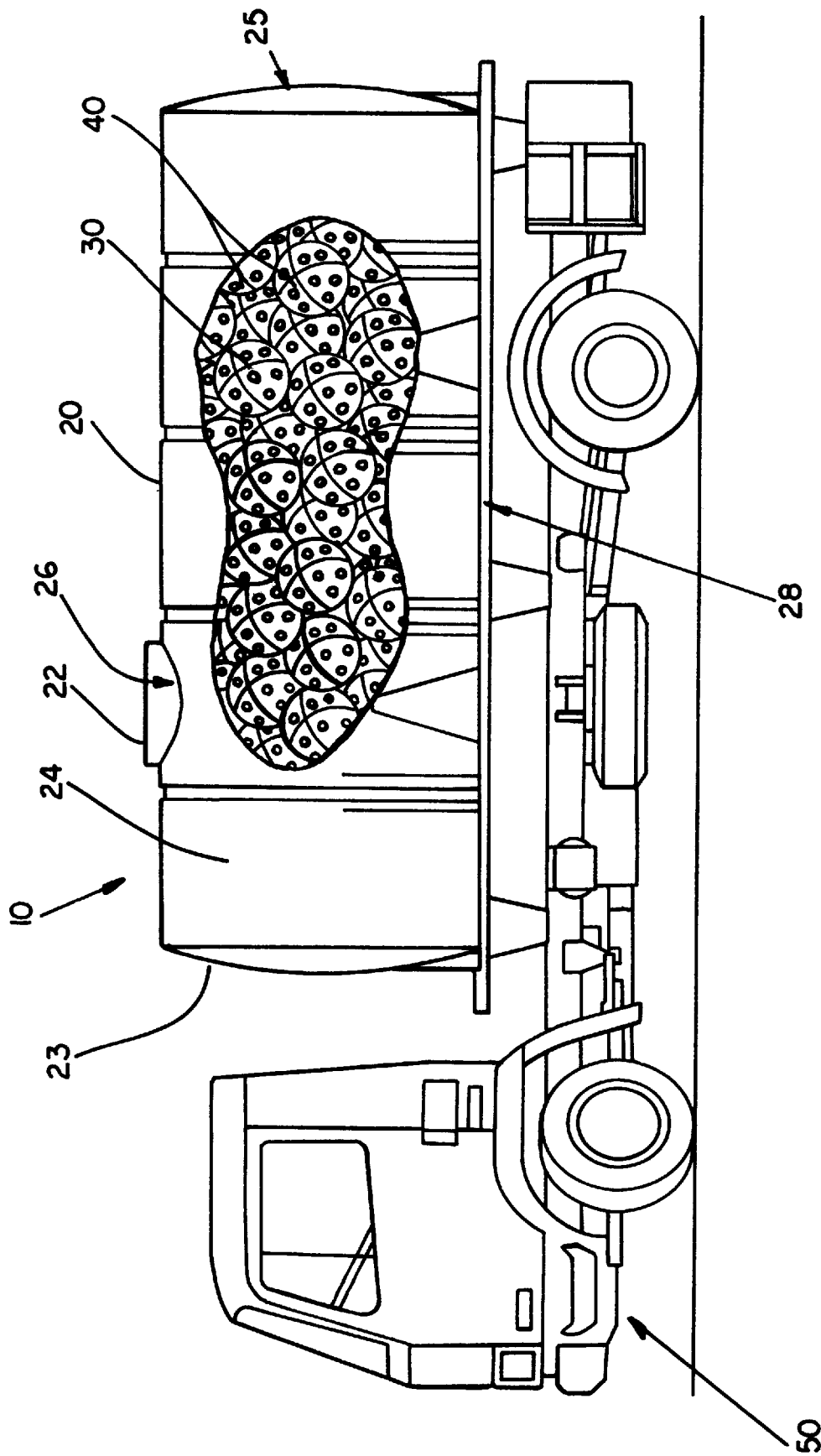
FIG. 1 is a side cutaway view of a liquid storage tank secured onto a truck, wherein the storage tank is filled with baffle balls.

The storage tank and non-permanent baffle system (10) of the present invention, as shown in FIG. 1, is comprised of a liquid storage tank (20) and a baffle system (30), wherein the non-permanent baffle system (30) includes a plurality of baffle balls (40) placed within the liquid storage tank (20). The liquid storage tank (20) of the storage tank and non-permanent baffle system (10) can be any size conventional storage tank for liquids. However, in a preferred embodiment the liquid storage tank (20) is a large liquid storage tank with a capacity of at least 100 gallons, preferably at least about 3,000 gallons. This liquid storage tank (20) can be used for any type of liquid, but preferably is designed for the transportation of water or water based chemicals.

The liquid storage tank (20) is preferably designed to be affixed to a truck (50) trailer or tractor, as shown in FIG. 1. The liquid storage tank (20) is generally longer than it is wide or high. It contains an opening (22) or manway in its top surface (21) for the introduction of liquids into the liquid storage tank (20). The walls of the liquid storage tank (20) form a liquid storage space (26) contained inside the liquid storage tank (20).

This liquid storage space (26) accommodates at least 100 gallons, preferably 1,000 gallons and more preferably 3,000 gallons or more of a liquid. While the tank (20) can be formed in any shape, preferably the walls of the liquid storage tank (20) include a front wall (23), an end wall (25), a plurality of side walls (24) and a bottom wall (28). This liquid storage tank (20) can be formed from any conventional storage tank material, such as steel, but preferably is formed from a non-corrosive, heavy-duty plastic material, such as high density polyethylene.

The non-permanent baffle system (30), placed within the liquid storage tank (20), consists of a plurality of baffle balls (40). It is important to the invention that the baffle balls (40) substantially fill the entire liquid (20). Preferably at least about eighty percent (80%), more preferably at least about ninety percent (90%) and most preferably at least about ninety-five percent (95%) or more of the space (26) within the liquid storage tank (20) is filled with the baffle balls (40). If the baffle balls (40) do not substantially fill the liquid storage space (26) within the liquid storage tank (20), sloshing and the inertial effect of the liquid contained within the liquid storage tank (20) can still cause damage to the tank (20), which poses a risk for the driver of the truck (50) onto which the liquid storage tank (20) has been secured.

Figure 2:
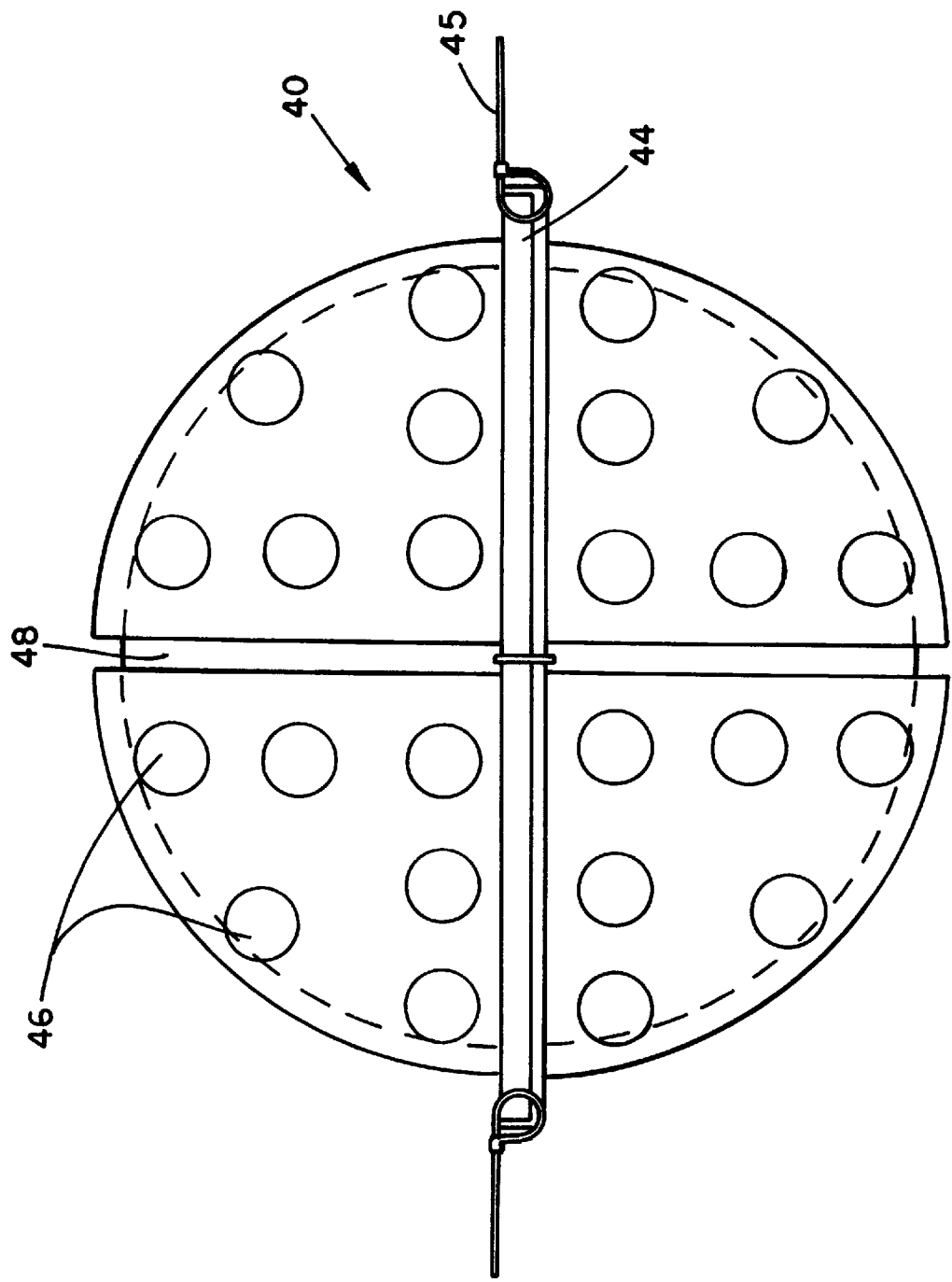
FIG. 2 is a side view of a baffle ball of the present invention.

The baffle balls (40) are preferably spherical in shape as shown in FIG. 2 (although other shapes are certainly within the disclosure of this invention) with a diameter which is slightly less than the diameter of the opening (22) in the liquid storage tank (20), preferably less than ten percent (10%) smaller than the diameter of the opening (22) in the liquid storage tank (20). Preferably the diameter of the baffle balls is at least about seven inches (7"). By designing the diameter of the baffle balls (40) to be less than the diameter of the opening (22) in the tank (20), the baffle balls (40) can be installed after the tank (20) has been constructed and can be removed from the tank (20) if the composition of the load within the tank (20) changes. Notwithstanding, it is preferable that the diameter of baffle balls be as large as possible to take up the smallest amount of space within the liquid storage tank (20). Thus, for example, with a conventional liquid storage tank (20) wherein the diameter of the opening (22) is about 16 inches, the diameter of the baffle balls (40) used within the tank (20) should be between about 15 and 15¾ inches. Some prior art systems used extremely small diameter spheres within storage tanks, with diameters of four (4) inches or less. While these spheres may diminish the impact of the movement of a liquid contained in the liquid storage tank (20) to some degree, they take up substantial space within the liquid storage tank (20) as a result of the liquid coating the inside and outside surfaces of the small diameter spheres, and thereby reduce the quantity of the liquid that can be stored within the liquid storage tank (20). In contrast, when using the non-permanent baffle system (30) of the invention, where the size of the baffle balls (40) is as large as possible, the reduction in the amount of liquid that can be stored in the tank (20) caused 20 by the presence of these baffle balls (40) is minimal, i.e., less than five percent (5%), preferably less than three percent (3%) and most preferably, less than one and a half percent (1.5%). For example, when the diameter of the baffle balls (40) is about 15¾ inches and when they are placed within a 3,000 gallon liquid storage tank (20), it is possible to substantially fill that tank (20) with only about 250 of the baffle balls (40) which occupy a limited portion of the space (26) within the tank (20). In addition, the use of the largest sized baffle balls (40) reduces the number of baffle balls (40) that are required to fill the tank (20), thereby reducing the cost of the non-permanent baffle system (30) while still providing adequate baffling effect for the liquid storage tank (20).

Figure 3:
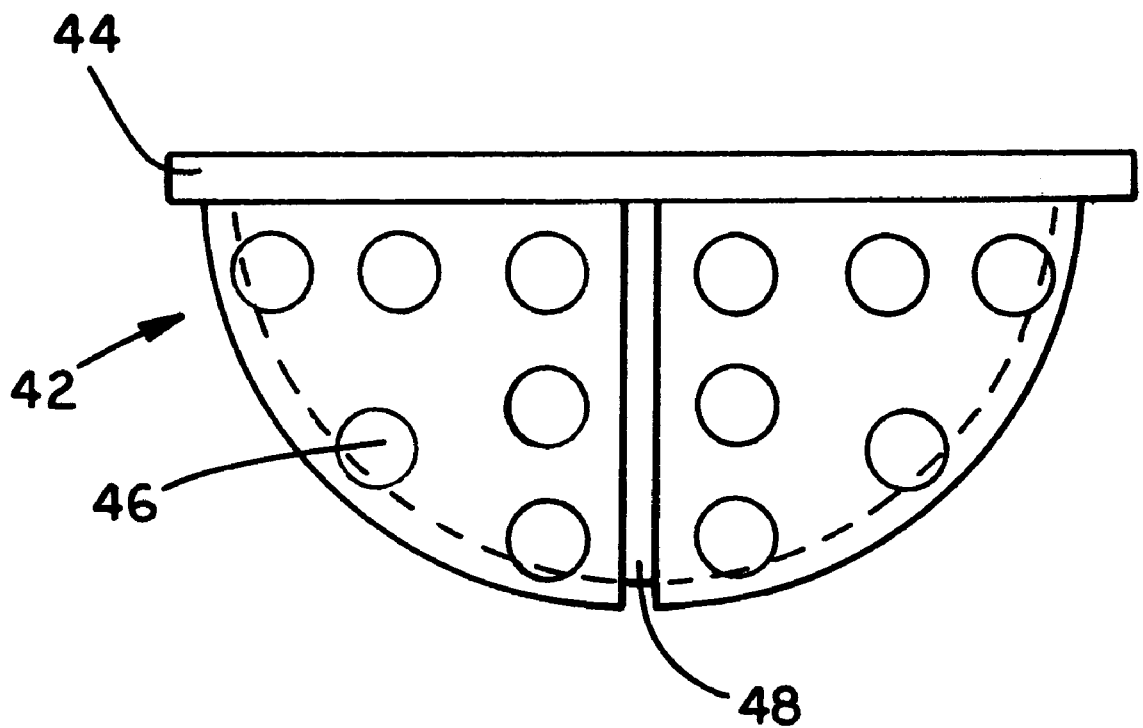
FIG. 3 is a side perspective view of one of the halves of a baffle ball.

While the baffle balls (40) can be formed as a single integral unit, in a preferred embodiment, the baffle balls (40) are formed in multiple sections, preferably in half-sphere shapes, as is shown in FIG. 3, which halves (42) Asymmetrical shapes may also be used to form the baffle balls (40). The two halves (42) can be joined by any conventional joining system. In one preferred embodiment, a lip section (44) is formed on the edge of each of the halves (42) of the baffle balls (40). The lip sections (44) 20 of the opposing halves (42) are then secured together, preferably by a conventional securing system, such as a plastic tie (45) as shown in FIG. 2.

Each of the baffle ball halves (42) contain a plurality of openings (46) in the walls of the halves (42) of the baffle ball (40). See FIGS. 2 and 3. It is important that there be sufficient openings (46) to allow the liquid in the tank (20) to move freely in and out of the baffle balls (40) while not providing so many openings (46) that the structural integrity of the baffle balls (40) is harmed. Thus, preferably, there are at least about 20 openings (46), preferably 24 openings (46) in each half (42) of the baffle ball (40). When the diameter of the baffle ball (40) is about 15¾ inches, the diameter of these openings (46) should be about 1 to 1¼ inch or greater.

The baffle balls (40) should be constructed of a sturdy, non-reactive material, preferably a high density polyethylene with a thickness of no more than about ⅛ inch. The composition of the baffle balls (40) should be selected to permit them to completely fill the tank (20).

Preferably the baffle balls (40) contain one or more support ribs (48) integral with their surface to provide additional structural stability for the baffle balls (40).

In use, the liquid storage tank (20) is secured onto the truck (50). The manway, or opening (22) in the top of the liquid storage tank (20), for the introduction of liquids within the storage tank (20) is measured to determine its diameter. Baffle balls (40) are then produced with a diameter only slightly less than the diameter of the opening (22) in the liquid storage tank (20). For example, if the opening (22) has a diameter of 16 inches, the outside diameter of the baffle balls (40) should be about 15½ inches. The baffle balls (40) are preferably assembled from baffle ball halves (42). A sufficient number of assembled baffle balls (40) are inserted through the opening (22) in the liquid storage tank (20) until they substantially fill the liquid storage space (26) within the liquid storage tank (20). The liquid is then introduced into the liquid storage tank (20). The liquid storage tank (20) may be filled to its capacity or a smaller amount may be introduced into the tank (20), as required by the customer. The truck (50) then transports the liquid to the required destination. The liquid contained within the liquid storage tank (20) is restrained from substantial, destructive movement by the non-permanent baffle system (30), which constitutes the baffle balls (40). Because the baffle balls (40) substantially fill the space (26) within the liquid storage tank (20), the non-permanent baffle system (30) substantially reduces the impact of movement of the liquid within the liquid storage tank (20), whether the liquid storage tank (20) is completely full or only partially filled. When liquid is removed from the liquid storage tank (20), and the truck (50) transports the remaining liquid within the tank (20) to a new location, the non-permanent baffle system (30) contained within the liquid storage tank (20) provides a restraining effect on the movement of the liquid within the liquid storage tank (20), even when the truck (50) increases or decreases its speed. Because the baffle balls (40) are designed with a diameter which is only slightly less than the diameter of the opening (22) in the liquid storage tank (20), a minimum number of baffle balls (40) are needed within the liquid storage tank (20). By adjusting the size of the baffle balls (40) to the size of the opening (22) in the liquid storage tank (20), a minimum amount of the liquid storage space (26) within the liquid storage tank (20) is occupied by the baffle balls (40), which results in increased storage capacity for the storage tank (20).

If desired, the baffle balls (40) may be replaced with different baffle balls (40), especially if the composition of the liquid to be transported in the tank (20) changes.

It will be apparent from the foregoing that while particular forms of the invention have been illustrated and described, various modifications can be made without departing from the spirit or scope of the invention.

I claim:

1. A liquid storage tank and non-permanent baffle system comprising a liquid storage tank, wherein said tank encloses a liquid storage space;

an opening in said liquid storage tank for introducing liquids into the liquid storage tank; and a plurality of removable baffle balls introduced through the opening into the liquid storage tank, wherein a diameter of the baffle balls is slightly smaller than a diameter of the opening in the liquid storage tank and wherein the baffle balls further comprise a support rib in a surface of the baffle balls.

2. The liquid storage tank and non-permanent baffle system of claim 1 wherein the diameter of the opening in the storage tank is less than about 10% larger than the diameter of the baffle balls.

3. The liquid storage tank and non-permanent baffle system of claim 1 wherein the baffle balls are spherical and hollow.

4. The liquid storage tank and non-permanent baffle system of claim 1 wherein the baffle balls include a plurality of openings in a surface of the baffle balls.

5. The liquid storage tank and non-permanent baffle system of claim 4 wherein at least 20 openings are present in the surface of each baffle ball.

6. The liquid storage tank and non-permanent baffle system of claim 1 wherein each baffle ball is comprised of a pair of half-spherical elements, secured together.

7. The liquid storage tank and non-permanent baffle system of claim 1 wherein the liquid storage tank has a liquid storage capacity of at least about 100 gallons.

8. The liquid storage tank and non-permanent baffle system of claim 1 wherein the baffle balls comprise no more than about 5% of the liquid storage space inside the liquid storage tank.

9. The liquid storage tank and non-permanent baffle system of claim 1 wherein the baffle balls comprise no more than about 3% of the liquid storage space inside the liquid storage tank.

10. The liquid storage tank and non-permanent baffle system of claim 1 wherein the baffle balls comprise no more than about 1½% of the liquid storage space inside the liquid storage tank.

11. The liquid storage tank and non-permanent baffle system of claim 1 wherein the baffle balls are produced from a high-density polyethylene.

12. The liquid storage tank and non-permanent baffle system of claim 1 wherein the diameter of the baffle balls is at least about 7 inches.

13. The liquid storage tank and non-permanent baffle system of claim 1 wherein the baffle balls substantially fill the liquid storage space within the liquid storage tank.

14. The liquid storage tank and non-permanent baffle system of claim 1 wherein the liquid storage tank is substantially filled with water.

15. The liquid storage tank and non-permanent baffle system of claim 1 wherein at least about 90% of the liquid storage space within the liquid storage tank is filled with baffle balls.

16. The liquid storage tank and non-permanent baffle system of claim 1 wherein at least about 95% of the liquid storage space within the liquid storage tank is filled with baffle balls.

17. The liquid storage tank and non-permanent baffle system of claim 16 wherein the baffle balls further comprise a plurality of support ribs secured in a surface of the baffle ball.

18. The liquid storage tank and non-permanent baffle system of claim 16 wherein each baffle ball is comprised of a pair of half spherical elements secured together.

19. A liquid storage tank and non-permanent baffle system comprising a liquid storage tank, wherein said tank encloses a liquid storage space;

an opening in said liquid storage tank for introducing liquids into the liquid storage tank; and a plurality of spherical baffle balls introduced through the opening into the liquid storage tank, wherein the diameter of the baffle balls is slightly less than the diameter of the opening in the liquid storage tank, wherein the baffle balls further comprise a support rib in a surface of the baffle balls, wherein at least about 90% of the liquid storage apace within the liquid storage tank is filled with baffle balls and wherein the baffle balls comprise no more than about 3% of the liquid storage space inside the liquid storage tank.

20. The liquid storage tank and non-permanent baffle system of claim 19 wherein at least about 95% of the liquid storage space within the liquid storage tank is filled with baffle balls.

* * * * *